(12) United States Patent
Schmidhuber

(10) Patent No.: US 6,720,503 B2
(45) Date of Patent: Apr. 13, 2004

(54) COMBINATIONAL WEIGHING APPARATUS WITH OVERLAPPING SUPPLY TROUGHS EACH WITH TWO BOTTOM FACES INCLINED AT AN ANGLE WITH RESPECT TO EACH OTHER

(75) Inventor: Josef Schmidhuber, Kraiburg (DE)

(73) Assignee: Multipond Waegetechnik GmbH, Waldkraiburg (DE)

(*) Notice: Subject to any disclaimer, the term of this patent is extended or adjusted under 35 U.S.C. 154(b) by 159 days.

(21) Appl. No.: 09/980,765
(22) PCT Filed: Feb. 21, 2001
(86) PCT No.: PCT/EP01/01988
§ 371 (c)(1),
(2), (4) Date: Nov. 1, 2001
(87) PCT Pub. No.: WO01/65205
PCT Pub. Date: Sep. 7, 2001

(65) Prior Publication Data
US 2002/0153177 A1 Oct. 24, 2002

(30) Foreign Application Priority Data
Mar. 3, 2000 (DE) .......................... 100 10 444

(51) Int. Cl.⁷ .......................................... G01G 19/387
(52) U.S. Cl. .................................... 177/25.18; 222/196
(58) Field of Search ..................... 177/25.18; 222/196

(56) References Cited
U.S. PATENT DOCUMENTS 4,398,612 A   8/1983  Mikami et al. ............... 177/25
4,516,644 A * 5/1985  Fukuda ..................... 177/25.18
4,548,287 A * 10/1985 Matsuura ................... 177/25.18
4,596,327 A * 6/1986  Yamano .................... 177/25.18
4,600,096 A   7/1986  Yamano et al. ............. 198/505
4,673,046 A   6/1987  Matsuura ....................... 177/1

FOREIGN PATENT DOCUMENTS

EP           0 082 696 A2   6/1983    .......... G01G/13/24

* cited by examiner

Primary Examiner—Randy Gibson
(74) Attorney, Agent, or Firm—George W. Neuner; Edwards & Angell, LLP

(57) ABSTRACT

A combinatorial weighing apparatus having a dispersing device (1) for the distribution of products to be weighed and a plurality of supply troughs (15) arranged alongside one another for feeding the products from the dispersing device (1) to weighing containers (13) are provided, each supply trough (15) having a bottom (16) with a first bottom face (17) and a second bottom face (18) connected thereto along an edge (36) which point towards the dispersing device (1) and are inclined to one another along the edge (36), wherein the first bottom face (17) is of substantially rectangular construction and has a first side edge (19) and the second bottom face (18) is bounded laterally by the edge (36) and a second side edge (37) which converge in the direction of the dispersing device (1) and wherein the first side edge (19) of a supply trough (15) at least partially overlaps in each case the second side edge (37) of a neighbouring supply trough (15).

13 Claims, 2 Drawing Sheets

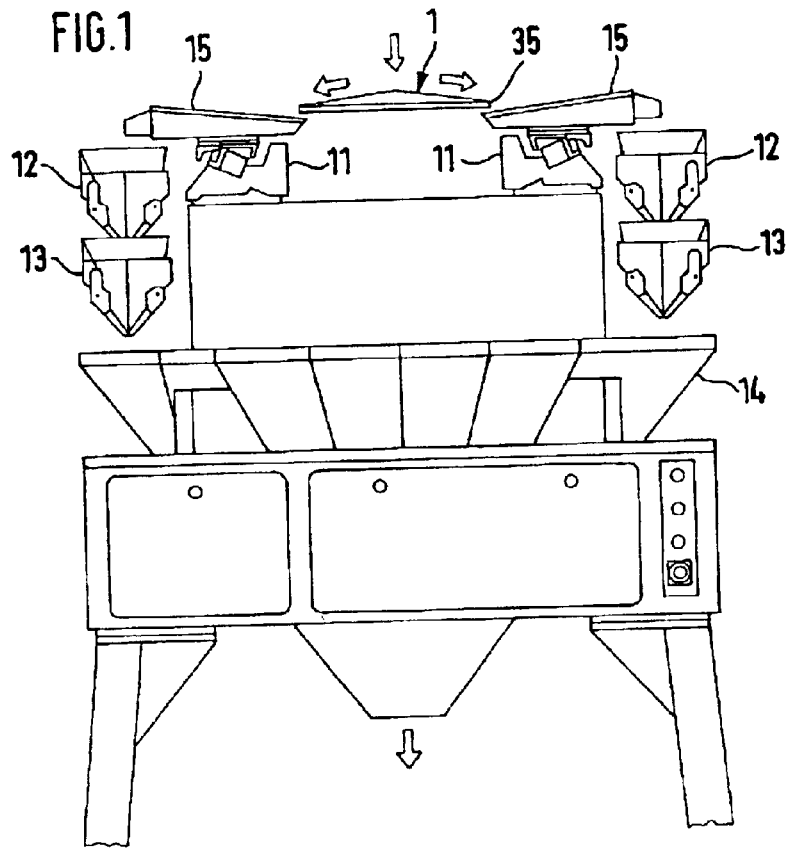
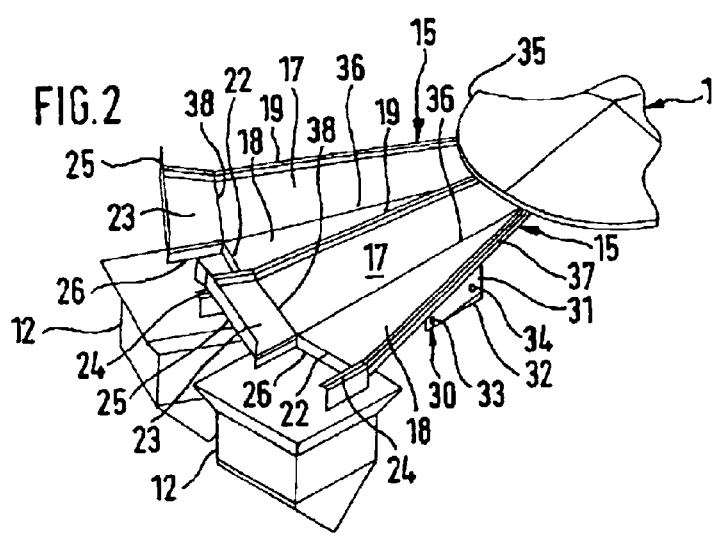

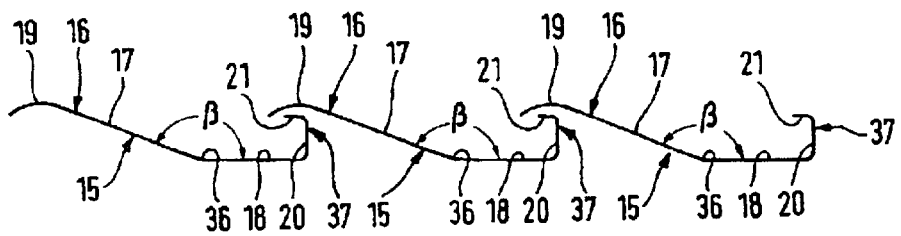
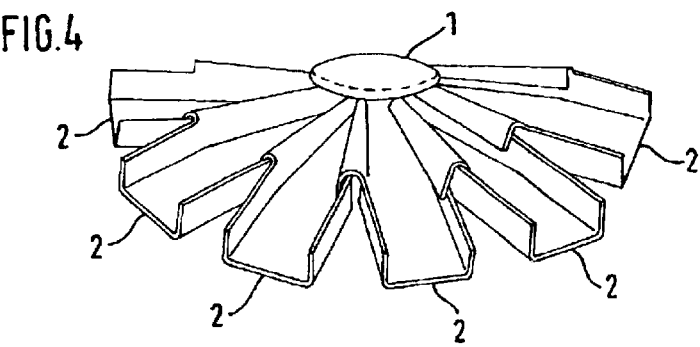
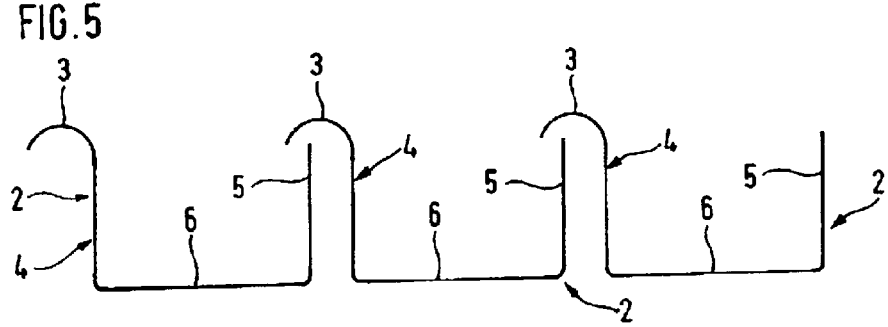
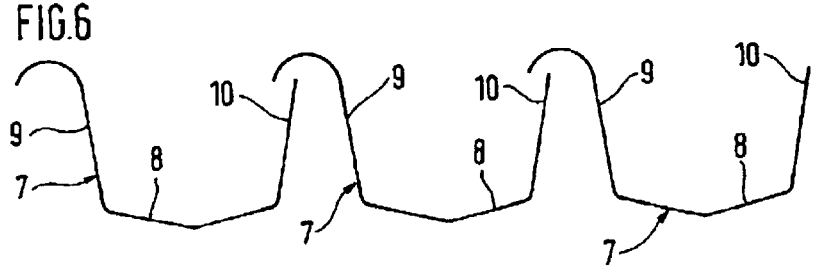

COMBINATIONAL WEIGHING APPARATUS WITH OVERLAPPING SUPPLY TROUGHS EACH WITH TWO BOTTOM FACES INCLINED AT AN ANGLE WITH RESPECT TO EACH OTHER

The invention relates to a combinatorial weighing apparatus.

In a combinatorial weighing apparatus disclosed in EP 0 082 696 A2, below a central dispersing device 1, as shown schematically in FIG. 4, a plurality of conveyor troughs 2 are arranged beside one another which convey the products to be weighed from the dispersing device 1 to weighing containers. In each conveyor trough 2, as may be seen in the schematic sectional view in FIG. 5, the upper rim 3 of one of the side walls 4, 5 in each case is bent over in such a way that the adjoining side wall 5 of the neighbouring conveyor trough 2 is overlapped. The overlapping begins below the edge of the dispersing device 1 and extends over a part of the length of the conveyor trough 2. In the case of elongated flexible products, such as spaghetti or flat noodles in the wet state or oiled rubber coils, it can happen that the products from the dispersing device 1 come onto the upper edge 3 and are pushed further outwards on the upper edge 3 by products pushing from behind. These products do not slide to the base 6 of the conveyor trough 2 and cling to the upper edge 3 of the side wall 4. They cannot be moved by vibration of the conveyor trough 2. The same difficulty occurs in the conveyor troughs 7 shown in FIG. 6 which differ from the conveyor troughs 2 shown in FIG. 5 in that each base 8 has an indented pleat and that the side walls 9, 10 do not extend at right angles to the base 8 but rather are inclined a little to the neighbouring conveyor trough 7 in question.

The object of the invention is to provide a combinatorial weighing apparatus in which elongated, flexible products can be reliably fed from the dispersing device via the supply troughs to the weighing containers.

The object is achieved by the combinatorial weighing apparatus of Claim 1.

Developments of the invention are specified in the subclaims.

Further characteristics and advantages of the invention emerge from the following description with reference to the figures of embodiments of the invention. The figures show:

FIG. 1 a sectional view of a combinatorial weighing apparatus of a first embodiment of the invention;

FIG. 2 a view in perspective of the arrangement of the dispersing device, conveyor troughs and the supply containers in the combinatorial weighing apparatus shown in FIG. 1;

FIG. 3 a schematic sectional view of the conveyor troughs in the combinatorial weighing apparatus shown in FIG. 1;

FIG. 4 a view in perspective of the arrangement of the dispersing device and conveyor troughs in a known combinatorial weighing apparatus;

FIG. 5 a schematic sectional view of the conveyor troughs shown in FIG. 4; and

FIG. 6 a schematic sectional view of other known conveyor troughs.

The combinatorial weighing apparatus in a first embodiment of the present invention is shown in FIG. 1. It contains a central dispersing device 1 having a dispensing edge 35 around which a plurality of conveyor troughs (feed channels) 15 are arranged each of which is connected to a vibration motor 11. Below an end of each conveyor trough 15 facing away from the dispersing device 1 a supply container 12 is arranged and below that a weighing container 13. The output openings of all weighing containers 13 lead into a hopper 14. The conveyor troughs 15 are arranged in such a way that the ends of the conveyor troughs 15 facing away from the dispersing device are located on a circle and that the ends of the conveyor troughs 15 facing towards the dispersing device 1 are located beneath the dispensing edge 35 of the dispersing device 1.

As may be best seen in FIGS. 2 and 3 each conveyor trough 15 has a bottom 16 having a first bottom face 17 and a second bottom face 18 joined to this along a first edge 36. The first bottom face 17 is of substantially rectangular construction and has a first edge (side edge) 19 pointing towards the neighbouring conveyor trough 15. The end of the first bottom face 17 facing towards the dispersing device 1 is arranged below the dispensing edge 35 of the dispersing device 1. The second bottom face 18 is of triangular construction running to a point towards the dispersing device 1 and a corner of the triangle is arranged below the dispensing edge 35 of the dispersing device 1. The side of the triangle opposite this corner forms a front end 22 of the second bottom face 18 which is arranged above the supply container 12. The width of this front end 22 is preferably selected to be the same as the width of the filling opening of the supply container 12. The first and the second bottom faces 17, 18 point towards the dispersing device 1 and are inclined to one another along the first edge. The two bottom faces enclose an angle $\beta$ of 150°–170°, the angle $\beta$ being preferably 160°. The two bottom faces 17, 18 are flat and the second bottom face 18 in cross-section is arranged horizontally.

The second bottom face 18 has a second edge (side edge) 37 which is best seen in FIG. 3. The second edge 37 has a first section 20 having a predetermined height which extends upwardly from the second bottom face 18 and a second section 21 adjoining this which is bent towards the second bottom face 18. The predetermined height of the first section 20 is selected in such a way that it is greater than the maximum height of products located on top of one another when the conveyor troughs are in operation. The first section 20 preferably extends vertically relative to the second bottom face 18 and the second section 21 preferably extends at right angles to the first section 20.

As can be seen in FIG. 3, the first edge 19 of the first bottom face 17 overlaps the second edge 37 of the second bottom face 18 of the neighbouring conveyor trough 15 and is curved towards the second bottom face 18 of the neighbouring conveyor trough 15. The radius of curvature of the first edge 19 is chosen to be as large as possible so that the edge 19 is not formed as an angular edge. Due to the flat inclination of the first bottom face 17 the first edge 19 can be formed with a large radius of curvature without formation of a kink or edge at the transition of the first bottom face 17 to the first edge 19. Since the first edge 19 is formed without kinks or edges elongated flexible products will not cling to the first edge. The first edge 19 is formed in such a way that it extends from the dispersing device 1 over the entire length of the neighbouring supply trough 15. It is essential that the overlap by the first edge 19 begins below the dispensing edge 35 of the dispersing device 1 so that no products fall between the supply troughs 15.

As can be seen in FIG. 2 the length of the second base 18 in the longitudinal direction of the supply trough 15 is chosen in such a way that the front end 22 of the second bottom face 18 facing away from the dispersing device 1 is arranged above the filling opening of the supply container 12. The length of the second bottom face 18 is preferably chosen in such a way that the front end 22 is located above a rear edge of the associated supply container 12, the rear edge being the edge having the smallest distance from the dispersing device 1. The length of the first bottom face 17 and of the second edge 37 in the longitudinal direction of the supply trough 15 is chosen in such a way that it is greater than the length of the second bottom face 18 and that the ends of the first bottom face 17 facing away from the dispersing device 1 and the second edge 37 are arranged above the filling opening of the supply container 12. The first side wall 17 and the second edge 37 preferably extent to the centre of the filling opening of the supply container 12. As can be seen in FIG. 2, a first end section 23 of the first bottom face 17 at the end of the first bottom face 17 facing away from the dispersing device 1 is inclined upwards along a second edge 38 which approximately at the height of the front end 22 of the first bottom face runs transverse to the longitudinal direction of the supply trough 15. At the front edge of the first end section 23 facing away from the dispersing device 1 a boundary wall 25 extending upwards and transverse to the longitudinal direction of the supply trough 15 is provided which prevents the products from falling over the front edge of the first end section 23 to the side of the supply container 12. A second end section 24 of the end of the second edge 37 facing away from the dispersing device is inclined upwards at the level of the front end 22 of the second bottom face 17. Seen in plan view the two end sections 23, 24 and the front end 22 of the second bottom face 17 bound a U-shaped perimeter. From this U-shaped perimeter a guide wall 26 extends downwards in the direction towards the supply container 12.

As shown in FIG. 2, in approximately the centre of each supply trough 15 on the underside of the base 16 a connecting device 30 for connecting the supply trough 15 to the vibration motor 11 is provided. The connecting device 30 contains a trough connecting member 31 fitted rigidly on the underside of the bottom 16 and a vibration motor connecting member 32 fitted on the vibration motor 11 (which is not shown in FIG. 2). The trough connecting member 31 has two first holes 33 and two second holes 34 at a distance from the former in the longitudinal direction of the supply trough 15 of which only one is shown in each case in FIG. 2. The second holes 34 are constructed as elongated holes. In the vibration motor connecting member 32 two third and two fourth holes (not shown) are formed at the positions corresponding to the first and second holes 33, 34. The trough connecting member 31 and the vibration motor connecting member 32 are connected to one another by means of bolts in the holes 33, 34. Since the second holes 34 are formed as elongated holes the inclination of the supply trough 15 can be adjusted to a desired value.

In operation the products to be weighed are fed from the dispersing device 1 to the supply troughs 15 as indicated by the arrows in FIG. 1, the products being fed principally to the first bottom face 17, but also to the second bottom face 18 of each supply trough 15. The supply troughs 15 are caused to vibrate by the vibration motors 11 and convey the products in batches into the supply containers 12. These deliver the batches of product to the weighing containers 13 in which the batches of product are weighed to determine the best possible combination and then transferred down from the correspondingly selected weighing containers 13 into the hopper 14. During conveyance of the products in the supply troughs 15 a portion of the products is conveyed by the first bottom face 17 onto the second bottom face 18 and then to the front end 22 of the second bottom face 18 and falls into the supply container 12. The remaining portion of the products is conveyed on the first bottom face 17 and the first edge 19 from the dispersing device 1 to the supply container 12. Due to the inclination of the first bottom face 17 and the first end section 23 towards the second bottom face 18 and due to the inclination of the first end section 23 upwards to the dispersing device 1 the products on the first end section 23 are accelerated towards the opening of the supply container 12 and by this means conveyed into the supply container 12. The boundary wall 25 prevents the products falling from the first end section 23 to the side of the supply container 12. If products cling to the first edge 19 they are either pushed by the products conveyed on the first bottom face 17 towards the neighbouring supply trough 15 and fall onto the second bottom face 18 in the neighbouring supply trough 15 where they are conveyed onwards or they become entangled with the products conveyed on the first bottom face 17 and as a result are conveyed onwards in the supply trough 15. Since the first edge 19 completely overlaps the second edge 37 of the neighbouring supply trough 15 it is ensured that the products pushed over via the first bottom face 17 do not fall between the supply troughs 15. Furthermore, the second edge 37 through the first and second sections 20, 21 prevents products in the supply trough 15 being pushed out on the side of the second edge 37 and falling between the supply troughs 15. The first and second end sections 23 and 24 prevent products on the end of the supply trough 15 pointing away from the dispersing device 1 falling to the side past the supply container 12 since they extend further over the opening of the supply container 12 than the front end of the second bottom face 18 and in this way form a lateral boundary. The inclination of the supply troughs 15 can be altered by means of the connecting device 30 and is adjusted with respect to the ease with which the products can be conveyed. The more easily the products can be conveyed the lower the inclination is set.

What is claimed is:

1. A combinatorial weighing apparatus, the apparatus comprising:
    a dispersing device for the distribution of products to be weighed;
    a plurality of weighing containers; and
    a plurality of supply troughs arranged alongside one another for feeding the products from the dispersing device to the weighing containers,
    each supply trough having a bottom with a first bottom face and a second bottom face connected thereto along a first edge which point towards the dispersing device, the first and second bottom faces being inclined to one another along the first edge,
    the first bottom face having an edge region, and
    the second bottom face being bounded laterally by the first edge and a side edge both of which converge in the direction towards the dispersing device, wherein
    the edge region of the first bottom face overlaps the side edge of a neighboring supply trough.

2. The combinatorial weighing apparatus according to claim 1, wherein the second bottom face is arranged horizontally in a cross-section of the trough.

3. The combinatorial weighing apparatus according to claim 1, characterized in that the first side edge is curved towards the bottom of the neighboring supply trough.

4. The combinatorial weighing apparatus according to claim 1, wherein the first bottom face has a first length a longitudinal direction of the supply trough which is greater than a second length of the second bottom face in the longitudinal direction.

5. The combinatorial weighing apparatus according to claim 1, wherein a boundary wall at an end of the first bottom face facing away from the dispersing device extends transversely to the longitudinal direction of the supply trough.

6. The combinatorial weighing apparatus according to claim 4, wherein the second side edge has a third length in the longitudinal direction of the supply trough which is greater than the second length of the second bottom face in the longitudinal direction.

7. The combinatorial weighing apparatus according to claim 1, wherein the second side edge extends over a predetermined length and has a section that is bevelled towards the second bottom face.

8. The combinatorial weighing apparatus according to claim 1, wherein the first and second bottom form an included angle of about 150° to about 170°.

9. The combinatorial weighing apparatus according to claim 1, wherein the supply troughs are arranged around the dispersing device.

10. The combinatorial weighing apparatus according to claim 1, wherein an inclination of the supply troughs is adjustable in the longitudinal direction.

11. The combinatorial weighing apparatus according to claim 1, wherein a first end section at an end of the first bottom face facing away from the dispersing device is inclined relative to the first bottom face along a second edge running transversely to a longitudinal direction of the conveyor trough.

12. The combinatorial weighing apparatus according to claim 11, wherein a second end section on an end of the second edge facing away from the dispersing device is inclined relative to the second bottom face along a third edge running transversely to a longitudinal direction of the conveyor trough.

13. The combinatorial weighing apparatus according to claim 1, wherein the first bottom face is substantially rectangular.

* * * * *